US009129426B2

(12) United States Patent
Gopalakrishnan et al.

(10) Patent No.: US 9,129,426 B2
(45) Date of Patent: Sep. 8, 2015

(54) MOTION COMPENSATION IN IMAGE PROCESSING

(75) Inventors: Girishankar Gopalakrishnan, Bangalore (IN); Alexander Ganin, Whitefish Bay, WI (US); Ravindra Mohan Majeshwar, Glenville, NY (US); Kris Filip Johan Jules Thielemans, London (GB); Scott David Wollenweber, Waukesha, WI (US); Floribertus P.M. Heukensfeldt Jansen, Ballston Lake, NY (US); Arunabha Shasanka Roy, Bangalore (IN)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 1274 days.

(21) Appl. No.: 12/873,039

(22) Filed: Aug. 31, 2010

(65) Prior Publication Data
US 2012/0051664 A1    Mar. 1, 2012

(51) Int. Cl.
*G06T 11/00* (2006.01)
*G06T 5/50* (2006.01)
*G06T 7/20* (2006.01)
*G06T 5/00* (2006.01)

(52) U.S. Cl.
CPC .............. *G06T 11/005* (2013.01); *G06T 5/002* (2013.01); *G06T 5/50* (2013.01); *G06T 7/20* (2013.01); *G06T 2207/10104* (2013.01); *G06T 2207/10108* (2013.01); *G06T 2207/20221* (2013.01); *G06T 2207/30004* (2013.01); *G06T 2211/412* (2013.01)

(58) Field of Classification Search
CPC ................................ G06Q 50/22; G06Q 50/24
See application file for complete search history.

(56) References Cited

U.S. PATENT DOCUMENTS

| | | | |
|---|---|---|---|
| 6,745,066 B1 * | 6/2004 | Lin et al. | 600/425 |
| 7,574,249 B2 | 8/2009 | Piacsek et al. | |
| 7,630,751 B2 | 12/2009 | Boese et al. | |
| 7,778,488 B2 * | 8/2010 | Nord et al. | 382/284 |
| 7,899,623 B2 * | 3/2011 | Marcelpoil et al. | 702/19 |
| 8,175,692 B2 * | 5/2012 | Kimura et al. | 600/511 |
| 8,423,596 B2 * | 4/2013 | Gifford | 708/401 |
| 8,472,683 B2 * | 6/2013 | Manjeshwar et al. | 382/128 |
| 2010/0046821 A1 | 2/2010 | Manjeshwar et al. | |
| 2010/0220222 A1 * | 9/2010 | Naito | 348/241 |

* cited by examiner

Primary Examiner — Eliza Lam
(74) Attorney, Agent, or Firm — Fletcher Yoder, P.C.

(57) ABSTRACT

Methods and systems for processing a set of images are described. In accordance with this disclosure, images are registered and an analysis is performed in view of one or more constraints (such as constraints based upon anatomical or physiological considerations). Weighting factors are determined based on the analysis. The weighting factors are used in subsequent processing of the registered (and/or unregistered) images and/or to formulate a visualization that conveys the degree of confidence in the motion estimation used in the registration process.

21 Claims, 6 Drawing Sheets

MOTION COMPENSATION IN IMAGE PROCESSING

BACKGROUND OF THE INVENTION

The subject matter disclosed herein relates to image processing techniques to correct or compensate for motion, such as in medical images.

In positron emission tomography (PET) imaging and single positron emission computed tomography (SPECT) imaging, a radiopharmaceutical is administered to a patient. The radiopharmaceutical is typically selected so as to be preferentially or differentially distributed in the body based on the physiological or biochemical processes in the body. For example, a radiopharmaceutical may be selected that is preferentially processed or taken up by tumor tissue. In such an example, the radiopharmaceutical will typically be disposed in greater concentrations around tumor tissue within the patient.

In the context of PET imaging, the radiopharmaceutical typically breaks down or decays within the patient, releasing a pair of gamma rays moving in opposite directions in the process. In SPECT imaging, a single gamma ray is generated when the radiopharmaceutical breaks down or decays within the patient. These gamma rays interact with detection mechanisms within the respective PET or SPECT scanner, which allow the decay events to be localized, thereby providing a view of where the radiopharmaceutical is distributed throughout the patient. In this manner, a caregiver can visualize where in the patient the radiopharmaceutical is disproportionately distributed and may thereby identify where physiological structures and/or biochemical processes of diagnostic significance are located within the patient.

The PET or SPECT examination may be conducted over a relatively lengthy time interval, such as over the course of twenty-five to thirty minutes. That is, the decay process associated with the radiopharmaceutical may take place over a period of time, during which measurements are collected and during which the patient must remain relatively still. However, it may be difficult for a patient to remain perfectly still over the period of time involved in such an examination. Further, even discounting the voluntary or controllable motions a patient may perform, various physiological processes, such as the patient's respiration and/or heartbeat, necessarily introduce motion into the examination process over the time interval in question. Such motion (voluntary or otherwise) can lead to artifacts and/or other discrepancies in the resulting visualizations, which may reduce or limit the ability of a caregiver or other medical professional to isolate the locations or locations of interest in a patient where the radiopharmaceutical is aggregated.

BRIEF DESCRIPTION OF THE INVENTION

In one embodiment, a method for processing an image is provided. In accordance with this method, a set of image data is gated to generate two or more sets of gated image data. A gated image is generated for each set of gated image data. The gated images are registered to generate one or more registered images. An analysis based on one or more motion-related criteria is performed to generate a respective weighting factor at least for each registered image. At least the registered images are combined based on the respective weighting factors to generate a final image.

In a further embodiment, a method for displaying image data is provided. In accordance with this method, two or more gated images are registered to generate two or more registered images. A confidence map is generated for each registered image. The confidence map conveys a quantitative measure of confidence for each voxel value of the corresponding registered image. A final image derived from the two or more gated images and a total confidence map for the final image are displayed. The total confidence map is derived using the respective confidence maps.

In an additional embodiment, an image processing system is provided. The image processing system includes image reconstruction and processing circuitry. The image reconstruction and processing circuitry is configured to process a set of image data and corresponding gating information to generate two or more sets of gated image data and to generate a respective image for each set of gated image data. In addition, the image reconstruction and processing circuitry is configured to register the respective images to generate one or more registered images and to generate a respective set of weighting factors at least for each registered image. Further, the image reconstruction and processing circuitry is configured to combine the registered images based on the respective weighting factors to generate a final image, and to display the final image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In accordance with the present disclosure, image data is acquired during an examination using an imaging modality, such as a PET or SPECT imaging modality, or another suitable imaging modality, such as computed tomography (CT) or magnetic resonance imaging (MRI). In one embodiment, the acquired image data is gated such that image data acquired during like periods of motion or like time intervals is binned together (for example, based on time/phase or displacement information). Motion between these gating intervals may be estimated using image registration techniques, such as by transforming the image data associated with each gate to correspond to a reference image (i.e., a reference gate), or other suitable motion estimation techniques. In one such example, based on the registration transformation, a set of motion vectors may be obtained that describe the motion of each respective gate relative to the reference gate. In one embodiment, the estimated motion vectors are analyzed and voxels are identified for which the estimated motion is not realistic based on known or assumed anatomical and/or physiological constraints. Based on this analysis, certain voxels may be discarded, underweighted, or overweighted in the image or images generated using the data. Likewise, the analysis of the estimated motion vectors and/or the images may be used to generate one or more confidence maps that may be displayed or overlaid with the registered images or the combined final image to display the localized confidence associated with these images. Such localized displays of confidence may be useful to a diagnostician evaluating the images.

Figure 1:
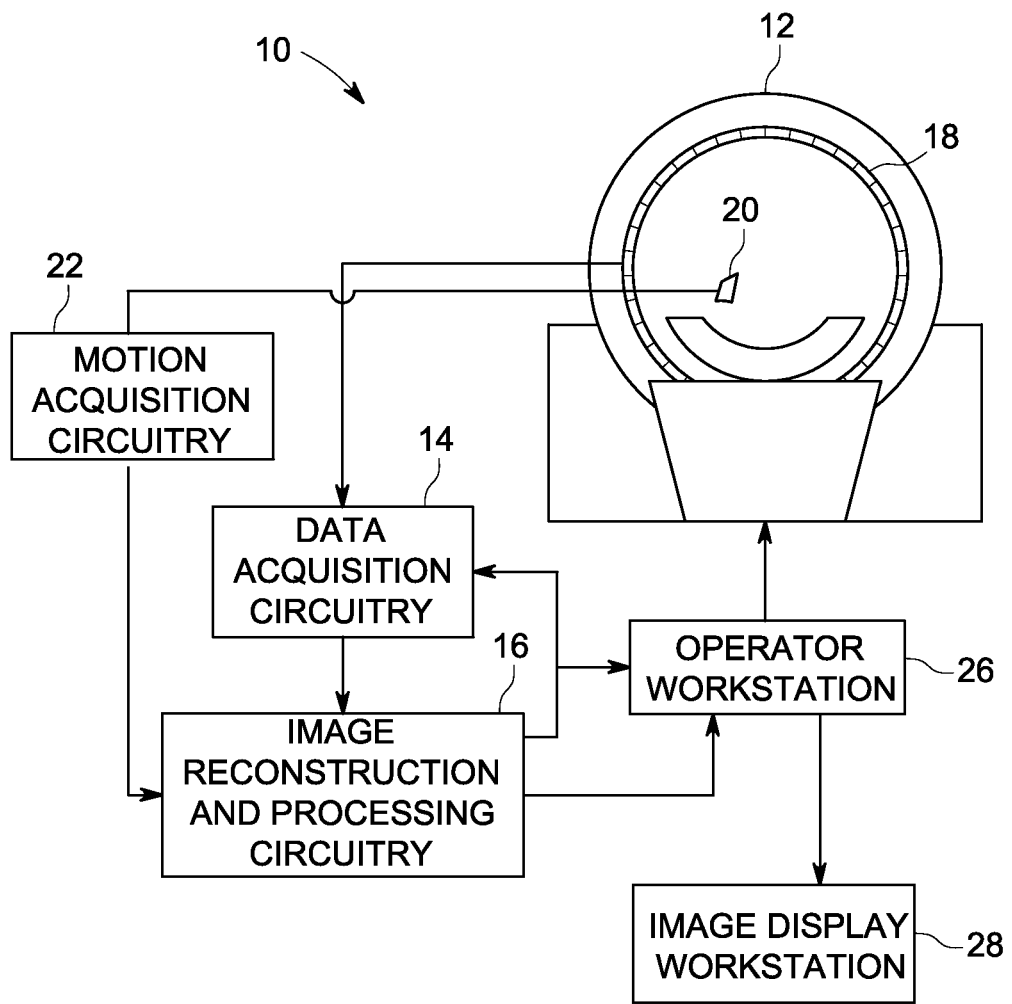
FIG. 1 is a diagrammatical representation of a PET imaging system in accordance with aspects of the present disclosure.

With the foregoing in mind and turning now to the drawings, FIG. 1 depicts a PET or SPECT system 10 operating in accordance with certain aspects of the present disclosure. As will be appreciated, in other implementations a respective imaging system may correspond to another type of imaging modality, such as a CT or MRI imaging system. The PET or SPECT imaging system of FIG. 1 is merely depicted and discussed to facilitate explanation of the presently disclosed image processing approach in a particular context so that aspects of the approach may be more readily understood.

Returning now to FIG. 1, the depicted PET or SPECT system 10 includes a detector assembly 12, data acquisition circuitry 14, and image reconstruction and processing circuitry 16. The detector assembly 12 of the PET or SPECT system 10 typically includes a number of detector modules (generally designated by reference numeral 18) arranged in one or more rings, as depicted in FIG. 1. The depicted PET or SPECT system 10 also includes an operator workstation 26 and an image display workstation 28.

In addition, in accordance with one embodiment, a motion sensor 20 (e.g., a motion tracker) and motion acquisition circuitry 22 are depicted. In one such embodiment, the motion sensor 20 and the motion acquisition circuitry 22 may be provided as separate from the PET or SPECT system 10, such as an electrocardiograph (or other electrical mechanisms for monitoring cardiac and/or respiratory motion), a respiration circuit including a flow gauge or meter suitable for monitoring respiration, and/or one or more accelerometers, strain gauges, or pressure sensors suitable for monitoring respiration and/or cardiac motion. In other embodiments, the motion acquisition circuitry 22 may monitor a cardiac and/or respiratory state of a patient using raw or processed image data, such as may be provided by the PET or SPECT system 10 or by a separate imaging modality (such as by computed tomography (CT) or other X-ray based imaging modalities or by visible-light or infrared cameras) used in conjunction with the PET or SPECT system 10.

To facilitate explanation and discussion of the operation of the PET or SPECT system 10, the detector acquisition circuitry 14, and the image reconstruction and processing circuitry 16 are shown separately from other illustrated components (e.g., the detector assembly 12, the operator workstation 26, and the image display workstation 28). However, in certain implementations, some or all of these circuitries may be provided as part of the detector assembly 12, the operator workstation 26, and/or the image display workstation 28. For example, the hardware, software, and/or firmware executed on or provided as part of the image reconstruction and processing circuitry 16, whether provided as part of the detector assembly 12, the operator workstation 26, and/or the image display workstation 28, may be used to perform various image processing actions described herein. In certain implementations the image reconstruction and processing circuitry 16 may include specially programmed hardware, memory, or processors (e.g., application-specific integrated circuits (ASICs)) for performing image processing steps for compensating for patient motion (e.g., respiratory motion) as discussed herein. Similarly, all or part of these motion compensation steps may be performed using one or more general or special purpose processors and stored code or algorithms configured to execute on such processors. Likewise, a combination of special purpose hardware and/or circuitry may be used in conjunction with one or more processors configured to execute stored code to implement the steps discussed herein. The results of such image processing steps may be displayed on one or both of the operator workstation 26 or a separate image display workstation 28, if present.

Keeping in mind the example of the PET or SPECT system 10 discussed above, or the corresponding components of other types of suitable imaging systems, a brief description of one example of such system is provided to facilitate further explanation of the present approach. By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of gamma rays. In each annihilation reaction, two gamma rays traveling in opposite directions are emitted. In a PET imaging system 10, the pair of gamma rays are detected by the detector assembly 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be estimated and a tumor, thereby, may be detected. Therefore, accurate detection and localization of the gamma rays forms a fundamental and foremost objective of the PET system 10.

In view of these comments, and returning now to FIG. 1, the detector acquisition circuitry 14 is adapted to read out signals generated in response to the gamma rays from the detector modules 18 of the detector assembly 12. The signals acquired by the detector acquisition circuitry 14 are provided to the image reconstruction and processing circuitry 16. The image reconstruction and processing circuitry generates an image based on the derived gamma ray emission locations. The operator workstation 20 is utilized by a system operator to provide control instructions to some or all of the described components and for configuring the various operating parameters that aid in data acquisition and image generation. The operating workstation 20 may also display the generated image. Alternatively, the generated image may be displayed at a remote viewing workstation, such as the image display workstation 22.

In certain instances the region of interest for which images are being generated may be subject to motion, either voluntary or involuntary. For example, images generated near the heart and/or lungs may be subject to respiratory and/or cardiac motion effects. Such motion may negatively impact the diagnostic value of images generated for these regions. Therefore, in certain embodiments, data related to physiological events resulting in motion, as may be acquired by the motion acquisition circuitry 22, may also be provided to the image reconstruction and processing circuitry 16 to perform motion compensation, correction, or identification.

In other instances, the localization and/or observed level of gamma ray emissions is expected to vary over time, such as due to physiological processes (e.g., metabolic processes) and/or the decay rate of the radiological agent. In such dynamic scenarios, a time model describing the kinetic behavior of the injected or ingested agent may be used in assessing measurements acquired over time relative to the model. In such implementations, motion may be a factor. Therefore, in certain embodiments, data related to physiological events resulting in motion may be similarly provided to the image reconstruction and processing circuitry when generating the dynamic images.

Figure 2:
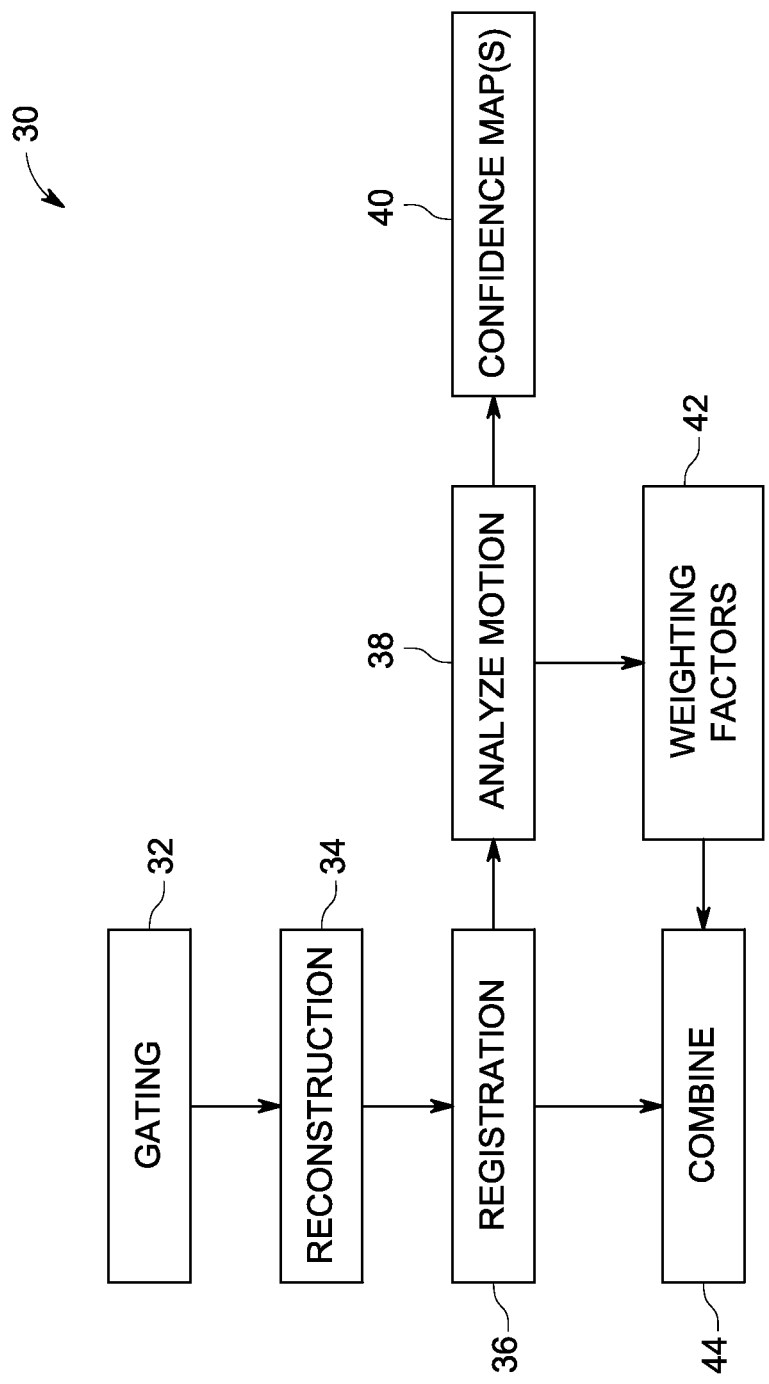
FIG. 2 is a block diagram depicting various aspects of one embodiment of the present disclosure.

With the foregoing in mind, and turning to FIG. 2, one example of a method 30 for identifying or compensating for patient motion for data acquired over time is described. In accordance with this example, a gating process 32 is employed to bin or otherwise separate data based on one or more criteria, such as respiratory motion, cardiac motion, time index, and so forth. The gated data may then undergo a reconstruction process 34 to generate one or more respective images corresponding to each set of gated image data. In one embodiment, the respective images may undergo a registration process 36 with one another or with one or more common reference images. The respective transformation (e.g., motion) vectors generated by the registration process may be provided for motion analysis 38 in view of one or more criteria, such as anatomical or physiological-based criteria or other suitable criteria, that may be used to evaluate whether each respective motion vector is possible, improbable, or impossible. Based on this motion analysis, one or more confidence maps 40 may be generated that convey the respective degree of confidence associated with the localization and/or intensity value of a voxel or region of voxels in the respective registered images or in a combined image generated using the registered images and/or unregistered images. In one embodiment, a confidence map 40 may convey, on a voxel-by-voxel basis, the confidence or certainty that the respective motion was estimated correctly in the registration process. Thus, in various contexts or implementations, the confidence maps 40 may convey the respective sum of errors in estimating each voxel, the respective displacement each voxel was moved during registration, or a weighted representation of one or both of these approaches. In addition or in the alternative, based on the motion analysis, a set of respective weighting factors 42 may be generated for each voxel or region of voxels in the respective registered images and/or in the corresponding unregistered images. The respective weighting factors 42 may be combined with their respective images to generate a combined image, such as by an addition or averaging process 44. This combined image may in turn be viewed by trained personnel for evaluation.

Figure 3:
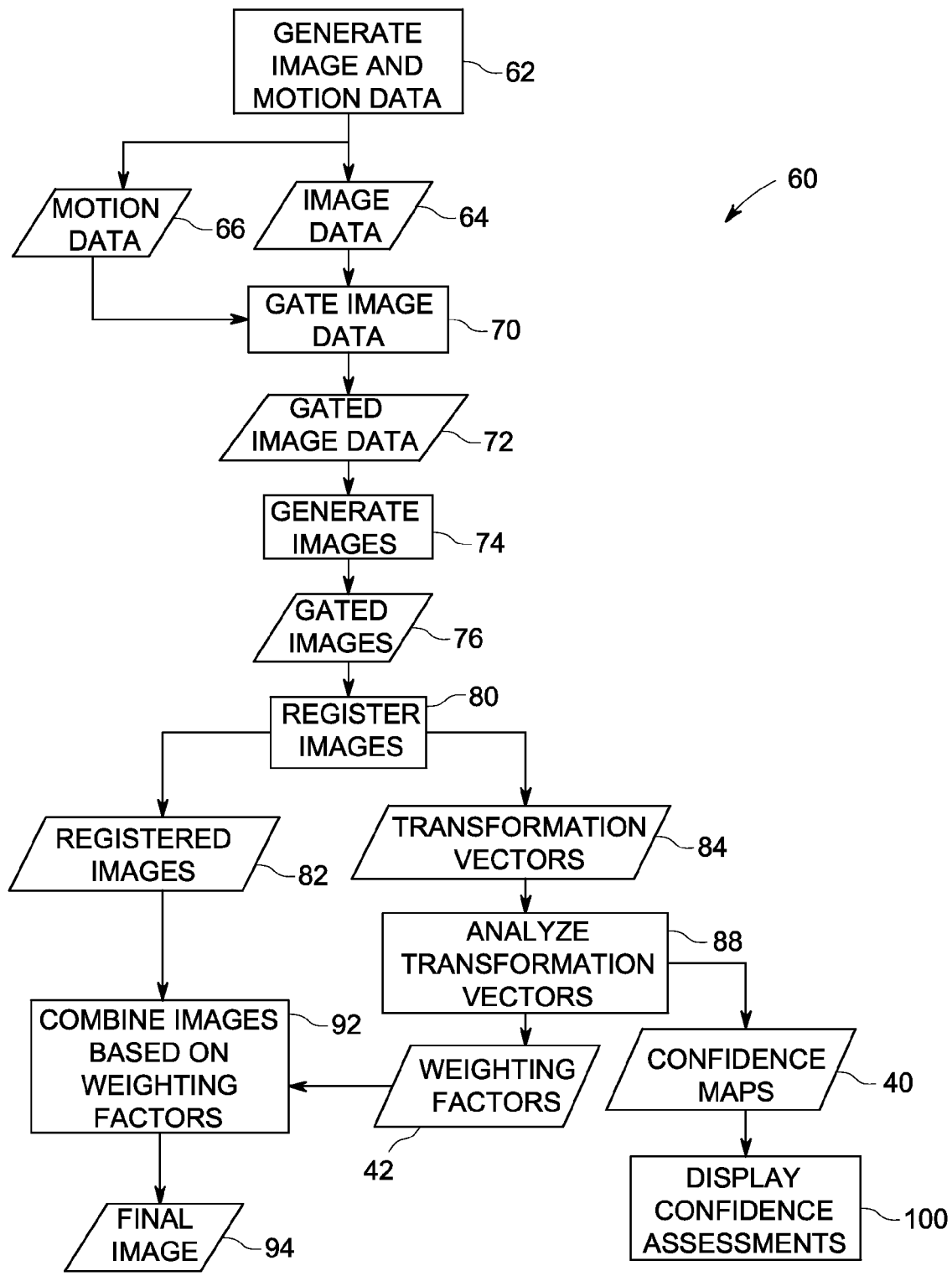
FIG. 3 is a flowchart depicting image processing steps in accordance with one embodiment of the present disclosure.

While FIG. 2 provides a brief overview of aspects of the present disclosure, certain of these aspects are discussed in greater detail below to provide additional explanation. For example, turning to FIG. 3, one example of a method 60 for identifying or compensating for differences in image data, such as due to patient motion is described. In accordance with this example, a set of image data 64 is generated (block 62) or otherwise acquired. In one embodiment, a set of corresponding motion data 66, such as respiratory or cardiac motion data, is acquired in conjunction with the image data. In the depicted example, a set of motion data 66 is used to gate (block 70) or bin the image data 64 into different phases of like data, e.g., gated data 72. In other embodiments, motion data 66 may be absent and the image data 64 may instead be gated based on the time index or interval associated with the acquisition process. For example, in such an embodiment, each gate or bin may contain the data acquired over a two-minute interval such that, during a ten-minute examination, five two-minute gates may be generated, one for each sequential two-minute interval of the examination.

Regardless of whether the gating process is based on motion, time, or motion and time, the gated image data 72 may be processed to generate (block 74) respective images 76 corresponding to each respective gate. That is, an image 76 is reconstructed using the data 72 associated with each gate to generate a respective image 76 corresponding to the respective gate. Once the gated images 76 are generated, these gated images 76 are registered (block 80) to one another or to one or more specified reference images, such as using a reference-based deformable registration technique. The registration process may be rigid or non-rigid and acts to transform each registered image 80, based on identified or segmented features, to correspond to a reference image having the same features. In one embodiment, the reference image may be one of the registered images 80 or the sum of some or all of the registered images, though in other embodiments the reference image may be a standardized image, such as an image from an atlas or generated using a kinetic model, or a structural image acquired via other techniques, such as computed tomography (CT) or magnetic resonance imaging (MRI).

The registration process 80 generates a set of registered images 82 which correspond to the gated images 76 after transformation to correspond to the respective reference image or images. In addition, the registration process 80 yields a corresponding set of transformation vectors 84 (e.g., motion vectors) for each registered image 82. In one embodiment, the transformation vectors 84 describe the magnitude and direction by which each voxel of the gated images 76 was moved in the registration process to generate the corresponding registered images 82.

In one embodiment, these transformation vectors 84 are analyzed (block 88) based on a set of criteria, such as known or assumed anatomical, physiological, and/or physical constraints. Based on this analysis, a set of weighting factors 42 may be generated for each registered image 82, such as for each voxel of the respective registered image 82. In certain embodiments, discussed below with respect to method 104 of FIG. 4, a similar set of weighting factors 106 may also be generated for each of the original gated images 76. In one embodiment, voxels of the registered images 82 that are subject to impossible or unlikely movements, such as cross-over events (i.e., instances where transformation vectors of neighboring voxels cross each other), may be underweighted or given a weighting factor of zero, essentially removing these voxels from subsequent operations or reducing their contribution to the subsequent operations. Such unlikely or impossible movements may be attributable to imperfections or errors in the registration process. Conversely, voxels subject to normal or expected movements may be fully weighted (e.g., given a weighting factor of one) or even overweighted to remain present in the subsequent operations or to be emphasized in such subsequent operations. In the embodiment where the registration process uses a reference image corresponding to a particular gate, voxels in the reference gate may be similarly fully weighted. For example, in the depicted embodiment, the registered images 82 are summed, averaged, or otherwise combined (block 92) based upon the respective weighting factors 42 to generate a final image 94. For example, like voxels in each registered image 82 may be summed, averaged, or combined in view of the corresponding weighting factors for that voxel in each of the registered images 82 to generate the final image 94.

As noted above, and as depicted in FIG. 4, in some circumstances, it might be desirable to assign weighting factors 106 to the original gated images 76 as well. For example, for a voxel that has a low weight in a registered image for a particular gate, a high weight can be assigned to the corresponding voxel in the original gated image and vice versa. One example of this would be when it is desirable to optimize the statistical quality of the combined image. If certain regions of voxels in certain gates were down-weighted, these voxels would look visually noisier in the combined image. By taking data of the unregistered, gated image into account in the combination, this can be avoided, although at the expense of some potential blurring of the combined image 94.

In addition or in the alternative, the analysis (block 88) of the transformation vectors 84 may be used to generate one or more confidence maps 40, such as for each respective registered image 82 and/or for the final image 94. As with the weighting factors 42, the confidence maps 40 may be generated based upon an analysis of the transformation vectors 84 in view of known or assumed anatomical, physiological, and/or physical constraints, such that a lower degree of confidence (or no confidence) is indicated for voxels that undergo impossible or unlikely movements (such as cross-over events) during registration, or for which the transformation vector may not be computed accurately. For example, transformation vectors for respective voxels where the associated deformation is not locally invertable and/or are not continuous (in space or between gates) may indicate low confidence in that respective transformation. Such confidence maps 40 may utilize color-coding or gray-scale intensity level to flag or otherwise visually indicate the locations of voxels with no or low confidence as compared to voxels where there is high confidence in the data and/or registration transformation.

Figure 5:
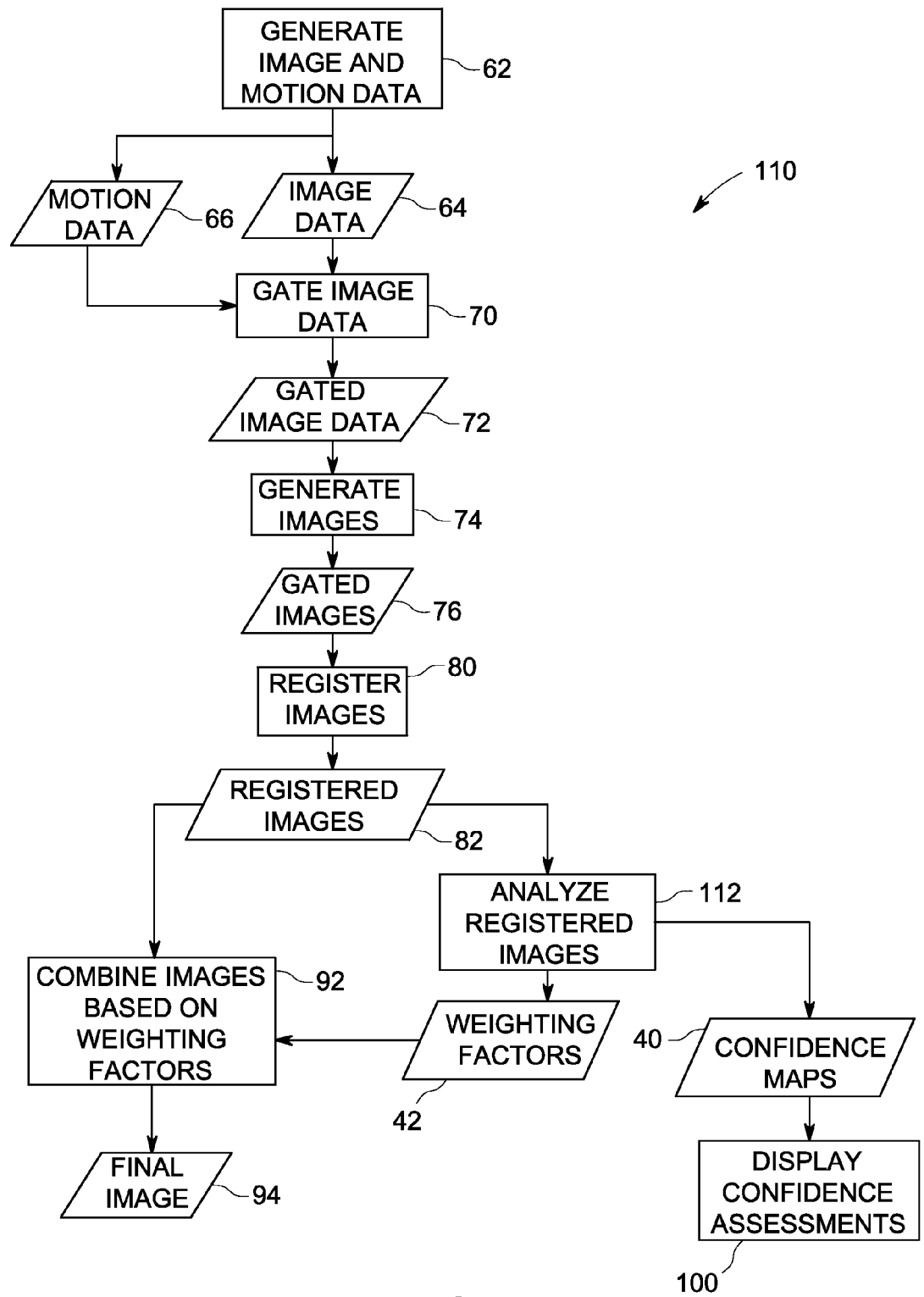
FIG. 5 is a flowchart depicting image processing steps in accordance with an additional embodiment of the present disclosure.
Figure 6:
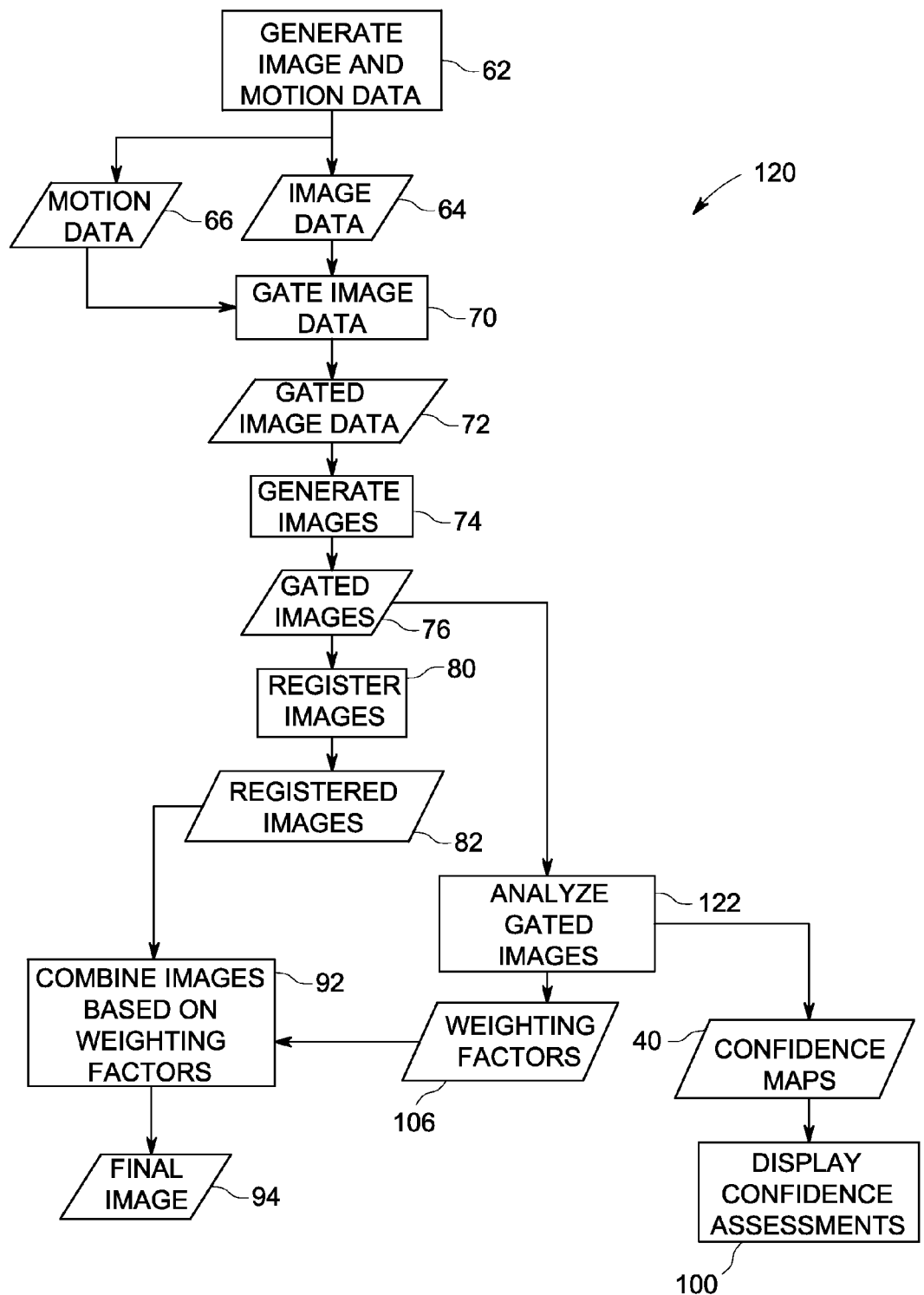
FIG. 6 is a flowchart depicting image processing steps in accordance with another embodiment of the present disclosure.

Further, as depicted in FIGS. 5 and 6, in certain embodiments the registered images 82 and/or the gated images 76 may be analyzed (block 112 of FIG. 5, block 122 of FIG. 6) instead of, or in addition to, the transformation vectors 84. In these embodiments, the respective weighting factors and/or confidence map(s) may be derived based on the respective gated images 76 or registered images 82, such as based upon differences between the images and/or upon other suitable image comparison or image processing approaches. For example, in such embodiments weighting factors and/or confidence maps may be generated based upon noise and/or gradient/curvature characteristics of the registered and/or gated images or through a bootstrapping approach (e.g., noise realizations of the same image). In another example, the local registration accuracy can be measured and the weighting factors can be chosen close to 1 and/or high confidence assigned to voxels where the registration is judged to be accurate. For example, in certain cases, the difference can be computed between the reference image and the registered image. The weighting factor for a voxel can then be computed using a function that is equal to 1 when the difference is zero, and decreases to zero for larger differences. One such function is to use $\exp(-d^2/(2\sigma^2))$ with d the difference and $\sigma$ a parameter that can depend on the expected noise level of the voxel value. As a further example, the computation of the weighting factors could use a first estimate of the combined image 94, after which the weighting factors could be adjusted and a new combined image could be generated. In one such embodiment, the weighting factors in the first estimate may be set to 1 (i.e., given full weight) prior to being updated based on the estimate of the final image. In these approaches error in the transformation (i.e., motion) vectors may be estimated without reference to anatomical or physiological constraints. Weighting factors and/or confidence maps derived in this manner may be used as with weighting factors and/or confidence maps derived using transformation vectors, as discussed herein.

In embodiments in which confidence maps 40 are generated, the confidence maps 40 may be displayed (block 100) with the respective registered images 82 or final image 94 to which they correspond, such as by overlaying the respective image with the respective confidence map 40 or by displaying the respective image and confidence map 40 side-by-side. For example, in one embodiment, confidence maps 40 may be generated for each registered image 80 and may be displayed overlaying or side-by-side with the respective registered image 80. In addition, the confidence maps 40 associated with each gate may be combined to form a single confidence map 40 corresponding to the final image 94.

In one embodiment, a confidence map 40 may convey (by color or gray-scale intensity or other visual means) the various Jacobian values at each voxel, as discussed herein, such that reference to the confidence map 40 visually relates an expansion ratio (or other metric of interest) associated with some or all of the voxels of a registered image 82. In such an implementation, the confidence maps 40 may be displayed (block 100) with the registered images 82 to provide a viewer with an indication of localized regions of transformation that appear to be impossible or improbable, or difficult to estimate. For example, the confidence maps 40 may be displayed with the corresponding registered images 82 as a combined or composite image, by overlaying the images, or by displaying the images side-by-side.

In certain embodiments, the display of images may be toggled, such as between an image associated with a high-confidence gate and an image associated with a low-confidence gate. In such an embodiment the display of all or part of such images may be toggled between (i.e., alternated). For example, each image (or portions of the images) may be displayed for a second, a half second, a quarter-second, or a tenth of second, before the other image (or corresponding portions) is displayed. In one implementation, the images may be toggled using a checkerboard display such that different, contiguous portions of the respective images are concurrently displayed, thereby highlighting motion and/or position differences in the images. In such an approach, the more different the images, the more obvious such differences will appear as the images are alternately displayed. In one embodiment, such a process may be performed automatically or semi-automatically (i.e., with user input or control over the otherwise automated process) by adding image data for which there is increasingly less confidence and assessing the impact on image quality. In this manner, a confidence threshold may be adjusted, either automatically or based on viewer-feedback.

In certain implementations, if the confidence in the registration results is low, the threshold allows the user to trade-off noise versus signal. Alternatively, the confidence metric can also include an image noise factor or other image-dependent factors. This may be useful when different gated images do not have the same level of noise. As using more voxels will decrease noise in the final image but necessitates using more voxels that have undergone a poor or low quality transformation, a combined total confidence metric can be constructed. In such an implementation, the threshold can vary voxel-by-voxel to optimize or maximize the total confidence.

As will be appreciated, in certain embodiments a user may be allowed to select between different confidence levels using a provided control, such as a slider, dial, or other computer-interface tool. In such an embodiment, selection or adjustment of a confidence level may result in the display of a corresponding image generated based on the selected confidence level. In this manner, the user can dynamically adjust the confidence level and see how the final image changes as the acceptance threshold is changed. In such an embodiment, a user may be able to "flip" back and forth between images while looking at a particular region or regions to see if a lesion (or other structure of interest) becomes more or less conspicuous as the amount of image data used to generate that region (or regions) is varied.

With the foregoing in mind, the respective analyses performed to derive weighting factors and/or confidence maps may, in certain embodiments, consist of calculating the Jacobian values from a deformation field (i.e., the Jacobian of the transformation) to derive a unitless expansion ratio for some or all of the different respective voxels of each registered image 82. In such an embodiment, the calculated expansion ratios may be used in evaluation of the motion of the voxels. For example, a Jacobian determinant less than 0 is indicative of a cross-over event and may, therefore, be used as an indication that the respective voxel should be discarded or underweighted. Likewise, Jacobian determinants between 0 and 1 are indicative of compression, which, depending on the imaging context and/or the degree of compression, may be indicative of an improbable or impossible motion. Jacobian determinants greater than 1 are indicative of expansion which, depending on the imaging context and/or the degree of expansion, may be indicative of an improbable or impossible motion. For example, Jacobian determinants greater than 1 may be indicative of expansion relative to the reference image and may, beyond a certain value (e.g., 5, 10, 15) may be indicative of a degree of movement that is physiologically unlikely or impossible. Thus, unusually or unexpectedly large expansion ratios and/or ratios near or below 0 may be indicative of voxels that should be discarded or underweighted. In other embodiments, alternative techniques may be used in the analysis of the transformation vectors to quantify confidence in a given transformation vector, for example topological methods such as identification of critical points using: (1) Thom's list of singularities: fold, cusp, swallowtail, butterfly, hyperbolic umbilic, elliptic umbilic, parabolic umbilic (2) eigenvalue based detection of critical points: attractors, repellors, rotation centers, saddle points. Such embodiments may be suitable for assessing continuity between gates, as opposed to estimates of confidence determined within a gate.

In certain embodiments, the weighting factor could depend on an estimate of intra-gate motion, which may be estimated using. For example, each gate (i.e., bin) has a finite extent and thus some of the gates will have an associated intrinsic blurring. In such an embodiment, the gate associated with the end of expiration (in a respiratory context) as the reference based on the assumption that such a gate would have less residual motion than other gates. Intra-gate motion may then be estimated (e.g., as part of the motion analysis) from the estimated transformation factors, the gated images, and/or a tracker signal generated using the motion sensor 20. Based on these estimates of motion, weighting factors 42 and/or confidence maps 40 may be generated. For example, those voxels in a gate that are estimated to be subject to large intra-gate motion may be down-weighted. In these embodiments, it may be possible to use a smaller number of gates compared to other embodiments.

In a given embodiment, the respective weighting factors $\omega_{gx}$ may be generated using one or more thresholds that can be either automatically determined or user selected. For example, in one implementation a weighting factor $\omega_{gx}$ may be assigned a value of 1 if the analysis of the transformation vectors determines that the motion being analyzed is physically and/or physiologically likely or possible and the weighting factor $\omega_{gx}$ may be assigned a value of 0 if the motion being analyzed is physically and/or physiologically improbable or impossible. In more graded implementations, weighting factors between 0 and 1 may also be assigned based on the degree of likelihood of the analyzed motion or the error estimate of the motion vector based on image properties.

In certain embodiments, more than one threshold may be employed in assigning weighting factor values. For example, in an implementation in which Jacobian determinants are compared to a set threshold, multiple thresholds may be employed such that one threshold is used in determining physiologically unlikely degrees of expansion while another threshold is used in determining physiologically unlikely degrees of compression and/or cross-over events. In one such example, a threshold of 3 may denote Jacobian values indicative of unlikely or impossible degrees of expansion while a threshold of ⅓ may denote Jacobian values indicative of unlikely or impossible degrees of compression and/or (for values under 0) cross-over events. Thus, in such an example a Jacobian determinant greater than or equal to 3 or less than or equal to ⅓ may result in a weighting factor of 0 being assigned. Conversely, a Jacobian determinant between 3 and ⅓ may result in a weighting factor of 1 being assigned. In other implementations, a Jacobian determinant between 3 and ⅓ may result in a weighting factor between 0 and 1 being assigned, with less weight typically being assigned for Jacobian values nearer to the threshold values. As will be appreciated, different thresholds may be employed for different anatomical regions. For example, imaged regions encompassing bone, the liver, and/or lung tissue may be processed using different thresholds from one another and/or with respect to other types of tissue.

In other embodiments, a weighting factor value may be determined as a function of a Jacobian determinant without utilizing thresholds. For example, a weighting factor value $\omega_{gx}$ may be determined as a function of $|J_{gx}|$ where $J_{gx}$ is the Jacobian determinant at gate g and location x. In one such example, the function may be 0 where the Jacobian determinant is 0 or less and may increase to a value of 1 when the Jacobian determinant is 1, and then decrease again as the Jacobian determinant increases from 1. As will be appreciated, such a function may be constructed to depend on gate and/or voxel location such that for different voxel locations and/or gates the shape of the function may differ. For example, for a gate corresponding to a respiratory expiration, some degree of compression may be expected compared to inspiration. Therefore, for such an expiration gate, compressions between 0% to 30% may be fully weighted, i.e., may receive a weighting factor of 1. Further, in implementations employing such weighting functions, a global scale factor may be employed so that the sum of the respective weighting factors at a given voxel is 1.

Thus, as discussed herein, a variety of approaches may be utilized to generate weighting factors based on motion for the respective registered images, gated images, and/or for different regions within such images. For example, such weighting factors 42, 106 may be generated based on an analysis (block 88) of transformation vectors 84 (as in the above example), based on analysis of the registered images (block 112), and/or based on analysis (block 122) of the gated images. Such weighting factors 42, 106 may be generated using the Jacobian approaches discussed above, or other techniques to understand topological information, and the weighting factors may correspond voxel-for-voxel with each registered image 82 or other corresponding image. If multiple methods are used to find weighting factors and/or confidence values, they can be combined, for instance by multiplication or other numerical manipulations. As discussed herein, the weighting factors 42, 106 allow voxels that appear to have undergone impossible or unlikely moves during transformation to be discarded or underweighted in a subsequent combination process 92 used to generate a final image 94 that is motion-compensated or corrected and/or is noise reduced to the extent that such noise may be attributable to patient motion.

In one embodiment each corresponding voxel value within the registered images 82 may be averaged or summed, taking into account the corresponding weighting factors 42. For example, a given voxel value in an averaged or final image may be given by:

$$V_x^{AVG} = \frac{\sum_g \omega_{gx} v_{gx}}{\sum_g \omega_{gx}} \quad (1)$$

where g denotes the different gates over which averaging is being performed; x denotes a respective voxel position within the images; $\omega_{gx}$ corresponds to the weighting factor 42 for a given voxel in a given registered, gated, image; $v_{gx}$ corresponds to the voxel value for a given voxel in a given registered image; and $V_x^{AVG}$ denotes the averaged voxel value for a respective location x.

As will be appreciated, the variance of the voxel value in a single gate may in fact vary for different gates g if the different gates have different associated noise levels. In this case, this variance can be taken into account in the averaging process in equation (1) by dividing the weight expressing confidence in the motion estimate for a particular gate by the voxel variance (due to other noise factors) for the gate.

The use of weighting factors in the combination process 92, as discussed herein, may result in different amounts of data contributing to the different voxels of the final image 94. That is, some voxels may be excluded or underweighted for certain voxels, reducing the amount of data contributing to those voxels. In one implementation, a constraint is imposed such that a certain percentage (e.g., 40%, 50%, 60%, 70%, 80%) of the available data at a voxel is used so that there is equal noise contribution at each voxel. Such a constraint may act to conserve signal while providing equal noise throughout the image. For example, in one embodiment the n best gates (e.g., the best 2, 3, or 4 gates) for a given voxel based on the determined weighting factors may be employed to equalize noise while conserving signal. Such constraints may be automatically determined based on image strength and/or may be user configured or selected.

Figure 4:
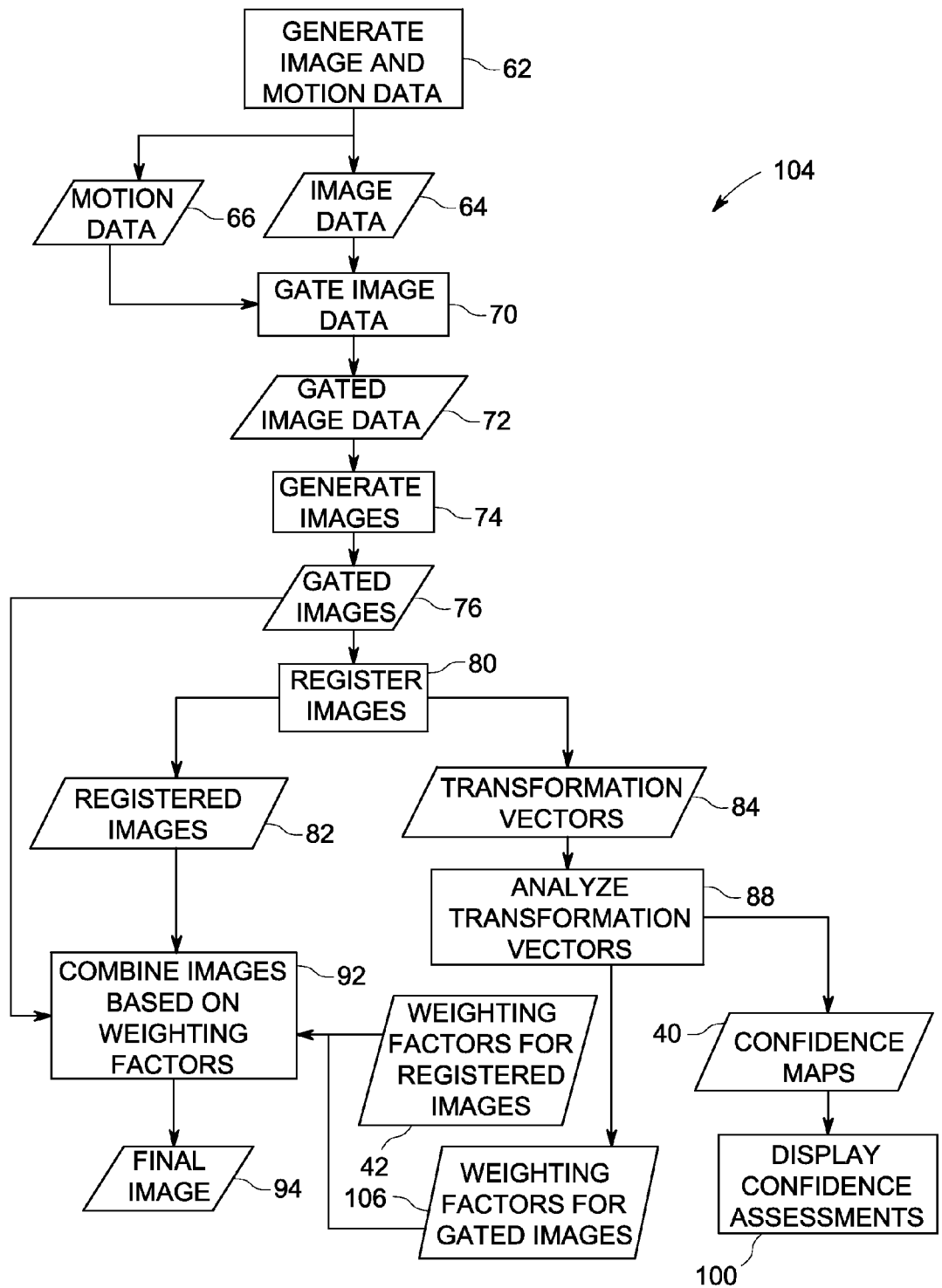
FIG. 4 is a flowchart depicting image processing steps in accordance with a further embodiment of the present disclosure.

In addition or in the alternative, weighting factors may also be assigned to the original (i.e., unregistered) gated images 76, as discussed with respect to FIG. 4. In the simplest case, these weights can be chosen such that each voxel gets the same total contribution of the gate, i.e., if the voxel has a weight of $\omega_{gx}$ for the registered image 82, the same voxel could be assigned a weight of $(1-\omega_{gx})$ for the corresponding unregistered image 76. As discussed before, this would preserve "noise" due to statistical variation between the gates, but potentially increase "noise" due to motion. Therefore, this option may be useful in regions where only small (relative to the size of the region) movement is expected and/or detected. In general, if a high weight is assigned to a voxel in the registered image for a particular gate, a low weight would be assigned to the voxel in the corresponding unregistered image.

In addition or in the alternative, the analysis (block 88, 112 and/or 122) may be aggregated or otherwise used to generate a confidence map 40 that, on a voxel-by-voxel basis, describes the degree of confidence that may be attributed to the respective voxels of the final image 94. Such a confidence map 40 may be particularly useful where the final image is not generated using the weighting approach described above but is instead generated simply by averaging (or otherwise combining without weights) the respective registered images 82. In one such embodiment, the confidence map 40 may be displayed with the final image 94 by overlaying, by displaying side-by-side, or by any of the other display arrangements discussed herein. In one such implementation, a weighted sum at each voxel of such a combined image was given in equation (1). As the weighting factors are related to the confidence in the voxel value for each image, a confidence map may be generated for the combined image (i.e., final image 94) by computing the average of the weighting factors:

$$C_x = \frac{\sum_g \omega_{gx}}{N} \quad (2)$$

where $C_x$ is the confidence in the voxel value at index x in the combined image constructed according to equation (1), and N is the number of gates. As mentioned above, it could be especially useful to have a confidence map in an embodiment where the combined image is constructed with simple (unweighted) averaging. A combined confidence could then be computed as the harmonic mean of the weights $$C_x^{unweighted} = \frac{N}{\left(\sum_g 1/\omega_{gx}\right)}. \quad (3)$$

This confidence can be shown to be always lower than the confidence (2) in the final image constructed by weighted averaging.

While the preceding describes certain possible implementations using weighting factors 42, 106, other approaches to combine the images are also possible. For example, in one implementation the images are combined by iteratively finding the best image that transforms into the gated images (taking the resolution of the imaging system into account). For example, this may be done by minimizing an objective function. The objective function may be modified by using voxel and gate dependent weight factors derived from an analysis of the corresponding transformation vectors 84, such as based on a confidence metric derived based on an analysis of the transformation vectors 84.

As noted above, the approaches discussed herein may be suitable for use in the processing of dynamic data acquired in the presence of patient motion in which the underlying subject matter is expected to differ over time. Such dynamic image data may be acquired in contexts where the image data changes over time due to transport or breakdown of a radiological agent and/or due to metabolic or physiological processes. For example, injection or ingestion of the radiological agent, transport of the agent throughout the body, and/or breakdown of the agent over time may lead to different expectations in terms of the image data over the course of the image data acquisition. Therefore, the images generated from data acquired at different intervals during the imaging process would not be expected to be the same.

For example, in the context of dynamic PET or SPECT, a model may be employed that describes the expected distribution of the radiological agent over time. Such a time-based model may be a kinetics-based and/or static model that accounts for properties of the radiological agent, generalized physiological and metabolic principles and models (e.g., transport, retention, and/or breakdown of the radiological agent in the body) and patient-specific factors (e.g., patient age, sex, height, weight, and/or diagnosed conditions). For example, in one embodiment the images acquired over time may be used to fit the parameters of a model so that the model describes the behavior of the radiological agent in the patient over time. In one such example, image data acquired over time (e.g., forty minutes) may be binned into eight time frames or intervals and the binned data used to fit two kinetic model parameters corresponding to the "free exchange" and "retention" of the radiological agent. In accordance with the present disclosure, the results of the motion analysis (e.g., the confidence measures) of the registration transformation vectors may be used or incorporated into the fitting of the kinetic model parameters (e.g., free exchange, retention, and so forth).

In one such example, a weighted least squares fit may be used to derive the model parameters of interest. In this example, each voxel/time frame has an estimated standard deviation associated with it. In conventional embodiments of dynamic PET or SPECT, the weight of the weighted least squares fit depends on the estimated noise level of the voxel value, which in a PET implementation may be based on the duration of the time frame, the number of random coincidences, and so forth. In the present example, however, the weighting factor may also be based on the determined confidence in the motion correction. In this manner, data from time frames for which there is high confidence about the estimated motion will contribute more to the fit for every voxel (i.e., will be weighted higher) than data from time frames for which there is less confidence, which may be given little or no weight.

With the foregoing example in mind, it should be appreciated that the present approaches may be used in generating images where the image data is dynamic and where there can be motion present in the image data. Further, in certain embodiments, gated dynamic imaging may be performed in which motion correction is performed between both gates (e.g., motion correction to address respiratory and/or cardiac motion) and time frames (e.g., correction based on the presence of dynamic data in which the underlying imaged volume changes over time due to physiological processes and/or degradation of the radiological agent and/or patient movement). In such embodiments, the weighting factors derived with respect to the motion correction would be taken into account in the kinetic fit of the appropriate models used to describe the dynamic nature of the underlying data.

While the preceding discussion provided examples in the context of medical imaging and, in particular, in the context of PET and SPECT, it should be appreciated that the present disclosure is also applicable in other imaging contexts, such as security or baggage screening, industrial or manufacturing quality control, and so forth. Likewise, the present disclosure is also applicable to other types of imaging modalities, such as computed tomography (CT), magnetic resonance imaging (MRI), and/or other suitable imaging technologies. Further, as discussed herein, the approaches discussed herein are also applicable in contexts where the underlying image data is dynamic in nature, and thus may represent an underlying image that is expected or assumed to change over time, such as over the course of a data acquisition session. In addition, while the present disclosure, for simplicity, generally describes the processing of anatomical images, such as might be suitable for display to a reviewer, it should be appreciated that the present approaches may also be implemented in image processing steps preceding development of such final or viewable images. For example, the steps discussed herein may also be implemented on pre-image data, such as on attenuation and/or projection data that may be subsequently processed to generate anatomical images.

Technical effects of the invention include using a suitably configured circuit or processor to calculate weighting factors based on an analysis of images and/or transformation vectors generated during an image registration process. The circuit or processor may further be employed to generate a final image using the registered (and/or unregistered) images and the respective weighting factors. Alternatively, in another embodiment, the circuit or processor may be utilized to generate one or more confidence maps after analyzing the images and/or transformation vectors generated during the image registration process. A confidence map may be displayed with the corresponding image to allow visualization of locations where motion estimation is compromised, or where anatomically or physiologically unlikely or impossible transformations have been performed during the image registration process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for acquiring and processing an image, comprising:

acquiring image data via a detector assembly of an imaging system;

utilizing a processor of an imaging processing system of the imaging system to access and execute one or more processor-executable routines encoded on a memory to perform the steps of:

gating a set of image data acquired by the detector assembly to generate two or more sets of gated image data;

generating a gated image for each set of gated image data;

registering the gated images to generate one or more registered images;

performing an analysis based on one or more motion-related criteria to generate a respective weighting factor at least for each registered image, wherein performing the analysis to generate the respective weighting factor comprises assigning a weighting factor for a voxel based on a difference between a reference image or an estimated final image and a respective registered image at the voxel and an expected noise level at the voxel;

combining at least the registered images based on the respective weighting factors to generate a final image; and displaying the final image on a display.

2. The method of claim 1, wherein the analysis also generates respective weighting factors for each gated image, and wherein the final image is generated by combining at least the registered images and the gated images based on the respective weighting factors of each to generate the final image.

3. The method of claim 1, wherein performing the analysis based on one or more motion-related criteria to generate the respective weighting factor at least for each registered image comprises analyzing respective transformation vectors associated with the generation of each registered image.

4. The method of claim 3, wherein analyzing the respective transformation vectors comprises one or more of analyzing the transformation vectors in view of anatomical or physiological-based criteria, analyzing the transformation vectors for motion indicative of deformations that are not locally invertable or are not continuous, analyzing the transformation vectors based on a first estimate of the final image to derive an estimate of error in the transformation vectors, calculating respective Jacobian values for a deformation field, analyzing the transformation vectors using techniques to understand topological information, or analyzing the transformation vectors to estimate intra-gate motion.

5. The method of claim 1, wherein performing the analysis based on the one or more criteria to generate the respective weighting factor comprises analyzing one or more of the respective registered images or gated images.

6. The method of claim 5, wherein analyzing the one or more of the respective registered images or gated images comprises one or more of analyzing the differences between the registered images themselves or with respect to the reference image, analyzing the differences between the gated images themselves or with respect to the reference image, analyzing the differences between the registered and gated images, analyzing the noise characteristics of one or both of the registered images or the gated images, analyzing the gradient characteristics of one or both of the registered images or the gated images, analyzing the curvature characteristics of one or both of the registered images or the gated images, analyzing one or both of the registered images or the gated images using a bootstrapping approach, or analyzing the differences between the gated images to estimate intra-gate motion.

7. The method of claim 1, wherein performing the analysis based on the one or more motion-related criteria to generate the respective weighting factor comprises analyzing one or more of the respective registered images or gated images and an estimate of the final image obtained by using an initial set of weighting factors.

8. The method of claim 1, wherein performing the analysis based on one or more motion-related criteria to generate the respective weighting factor at least for each registered image comprises finding a set of weighting factors based on different criteria, and multiplying the weighting factors obtained from each criteria.

9. The method of claim 1, where performing an analysis based on one or more motion-related criteria to generate the respective weighting factor at least for each registered image comprises performing the analysis in a region and/or voxel dependent way to produce a different set of weighting factors for different parts of each of the registered images.

10. The method of claim 1, wherein the one or more criteria comprise anatomical, physiological, or physical constraints.

11. The method of claim 1, wherein combining at least the registered images comprises multiplying the weighting factors with the constituent voxel values of the registered images to generate weighted registered images and summing the weighted registered images.

12. The method of claim 1, wherein combining at least the registered images comprises fitting the constituent voxel values of the registered images to determine parameters for a model describing the image data, wherein the fit takes the respective weighting factors into account.

13. An image processing system, comprising:
a memory encoding one or more processor-executable routines; and
a processor configured to access and execute the one or more routines encoded by the memory, wherein the routines, when executed cause the processor to:
process a set of image data acquired by a detector assembly of an imaging system and corresponding gating information to generate two or more sets of gated image data;
generate a respective image for each set of gated image data;
register the respective images to generate one or more registered images;
generate a respective set of weighting factors at least for each registered image by assigning a weighting factor for a respective voxel based on a difference between a reference image or an estimated final image and a respective registered image at the voxel and the expected noise level at the voxel;
combine the registered images based on the respective weighting factors to generate a final image; and
display the final image on a display.

14. The image processing system of claim 13, comprising the imaging system, wherein the imaging system comprises a PET or SPECT imaging system, comprising:
the detector assembly configured to detect gamma ray emissions from a patient; and
detector acquisition circuitry configured to generate signals in response to the detected gamma rays and of providing the signals to the processor in the form of the image data.

15. The image processing system of claim 13, wherein all or part of the processor and the memory is provided as part of a PET or SPECT imaging system or as part of an operator workstation or image display station in communication with the PET or SPECT imaging system.

16. A method for acquiring and processing an image, comprising:
acquiring image data via a detector assembly of an imaging system;
utilizing a processor of an imaging processing system of the imaging system to access and execute one or more processor-executable routines encoded on a memory to perform the steps of:
gating a set of image data acquired by the detector assembly to generate two or more sets of gated image data;
generating a gated image for each set of gated image data;
registering the gated images to generate one or more registered images;
performing an analysis based on one or more motion-related criteria in a region and/or voxel dependent way to generate a different set of weighting factors for different parts of each of the registered images, wherein performing the analysis to generate the respective sets of weighting factors comprises assigning a weighting factor for a respective voxel based on a difference between a reference image or an estimated final image and a respective registered image at the voxel and the expected noise level at the voxel;

combining at least the registered images based on the respective sets of weighting factors to generate a final image; and displaying the final image on a display.

17. The method of claim 16, wherein the analysis also generates a different set of weighting factors for different parts of each of the gated images, and wherein the final image is generated by combining at least the registered images and the gated images based on the respective sets of weighting factors of each to generate the final image.

18. The method of claim 16, wherein performing the analysis based on one or more motion-related criteria to generate the respective sets of weighting factors comprises analyzing respective transformation vectors associated with the generation of each registered image.

19. The method of claim 1, wherein assigning the weighting factors for the voxel comprises assigning the weighting factor for the voxel in accordance with the function $\exp(-d^2/(2\sigma^2))$ where d is the difference between the reference image or the estimated final image and the respective registered image at the voxel and $\sigma$ describes the expected noise level at the voxel.

20. The image processing system of claim 13, wherein the routines, when executed cause the processor to generate the respective set of weighting factors at least for each registered image by performing an analysis in a region and/or voxel dependent way to produce a different set of weighting factors for different parts of each of the registered images.

21. The image processing system of claim 13, wherein the routines, when executed cause the processor to assign the weighting factor for the voxel in accordance with the function $\exp(-d^2/(2\sigma^2))$ where d is the difference between the reference image or the estimated final image and the respective registered image at the voxel and $\sigma$ describes the expected noise level at the voxel.

* * * * *